United States Patent
Jensen

[15] 3,696,683
[45] Oct. 10, 1972

[54] ROLLING JOINT MECHANISMS

[72] Inventor: Preben W. Jensen, 21 Southside Avenue, Somerville, N.J. 08876

[22] Filed: May 15, 1970

[21] Appl. No.: 37,620

[52] U.S. Cl. .................74/89, 74/89.17, 74/89.18, 74/89.2, 74/96, 74/98
[51] Int. Cl......F16h 27/02, F16h 29/02, F16h 29/20
[58] Field of Search..........74/89, 89.2, 96, 98, 89.16, 74/89.17, 89.18

[56] References Cited

UNITED STATES PATENTS

| | | | |
|---|---|---|---|
| 2,764,894 | 10/1956 | Faxen | 74/89.2 |
| 3,046,799 | 7/1962 | Ash et al. | 74/96 X |
| 3,267,812 | 8/1966 | Hunkeler | 74/89.2 X |
| 3,488,098 | 1/1970 | Sobczak | 74/89.2 X |

OTHER PUBLICATIONS

Rolamite: A new Mechanical Design Concept, by D. F. Wilkes (Sandia Laboratory) Dec. 1967, (Pages 1, 17, 18, 19– 20, 62, 65, 67, relied upon.

Primary Examiner—William F. O'Dea
Assistant Examiner—P. D. Ferguson
Attorney—Sughrue, Rothwell, Mion, Zinn & Macpeak

[57] ABSTRACT

A rolling joint mechanism consisting of three parts which translates an angular input motion into an output motion of a different form. The parts, comprised of an input member, an output member and a frame, engage each other at specific points along contact surfaces and the points of contact of the three parts are all in a straight line. In addition, substantially pure rolling motion takes place at the engaging surfaces so that the mechanism is substantially free of sliding friction. Finally, the mechanism has the feature that the rolling surfaces may be reshaped so as to allow the mechanism to produce a variety of output motions for a given input motion.

12 Claims, 11 Drawing Figures

PATENTED OCT 10 1972　　　　　　　　　　　　3,696,683

INVENTOR
PREBEN W. JENSEN

BY Sughrue, Rothwell, Mion, Zinn & Macpeak
ATTORNEYS

PATENTED OCT 10 1972　　3,696,683

INVENTOR
PREBEN W. JENSEN

BY Sughrue, Rothwell, Mion,
Zinn & Macpeak

ATTORNEYS

ROLLING JOINT MECHANISMS

BACKGROUND OF THE INVENTION

1. Field of the Invention

This invention is in the field of art encompassing motion transferal devices and specifically devices for transferring motion in which sliding friction is substantially eliminated. 2. Prior Art In prior mechanical and electro-mechanical devices for transforming one form of motion into another, much efficiency, useful life and sensitivity of response were lost by sliding friction. Moreover, since a sliding friction force approaches a constant minimum level for normal loading under about 10 grams, the problems it creates increase as the size and driving force of the motion transforming devices decrease, as for example in microminiaturization technology.

The variety of output motions possible with prior art devices utilizing turning joints was very much restricted.

One prior art device sought to provide a motion transformation substantially without sliding friction by constraining a cluster of rotatable members within a guideway having walls spaced apart less than the combined diameter of the rotatable members by means of a flexible band disposed between and partially encompassing the rotatable members. This device, however, could only provide linear output motion due to the constraining walls.

SUMMARY OF THE INVENTION

In view of the limitations of the prior art, it is an object of this invention to provide mechanisms for translating angular motion into different forms of motion having only substantially pure rolling friction losses. It is a further object of this invention to provide a plurality of output motions for a single input motion. The invention comprises a rolling joint mechanism consisting of three members, one fixed and two movable. Sliding friction is substantially eliminated between the engaging surfaces by elements secured to the three members for insuring point contact between them. The shapes of the three members depend upon the precise output desired; the only design criterion for the mechanism being that the points of contact of the engaging surfaces lie on a straight line.

DETAILED DESCRIPTION OF THE INVENTION

Figure 1:
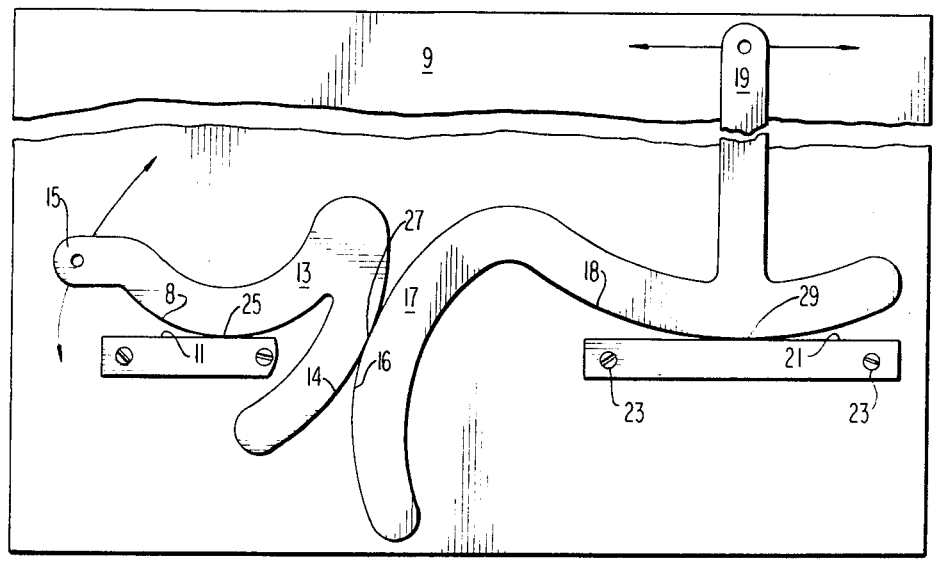
FIG. 1 is a side elevation view showing the invention in its basic form.

FIG. 1 shows the rolling joint mechanism in its basic form and illustrates the various features and principles of this device.

As shown, the rolling joint mechanism consists of an input member 13, an output member 17, an input support surface 11 and an output support surface 21. The input and output support surfaces may be separately supported but are shown in the figures as being commonly supported by frame 9.

The input member 13 is provided with two curved surfaces 8 and 14 and the output member is also provided with two curved surfaces 16 and 18. Input and output members 13 and 17 contact the frame 9 only at the input and output surfaces 11 and 21 respectively and they also engage each other along surfaces 14 and 16. Contact between the members and between each member and its respective support is constrained by means explained below to a point contact in each instance. Thus, all the contact points in the mechanism are rolling joints and sliding friction is avoided.

Input member 13 and output member 17 are so designed that when a point 15 on the free end of input member 13 is moved a point 19 on the free end of the output member 17 moves in a straight line. In operation, the mechanism functions as follows: when the free end 15 of input member 13 is moved the curved surface 8 of input member 13 rolls on the support surface 11 at point 25 and the curved surface 14 engages the curved surface 16 of output member 17 at point 27 causing the curved surface 18 of output member 17 to roll on supporting surface 21 at point 29. Since point 19 on the free end of output member 17 is the central point of a circular arc point 19 parallels the contour of surface 21 and defines a straight line. However, the path of point 19 is not restricted to a straight line but the two surfaces 18 and 21 may be shaped so that point 19 describes any desired path. The other surfaces must then be reshaped according to the desired input-output relationship.

Figure 2:
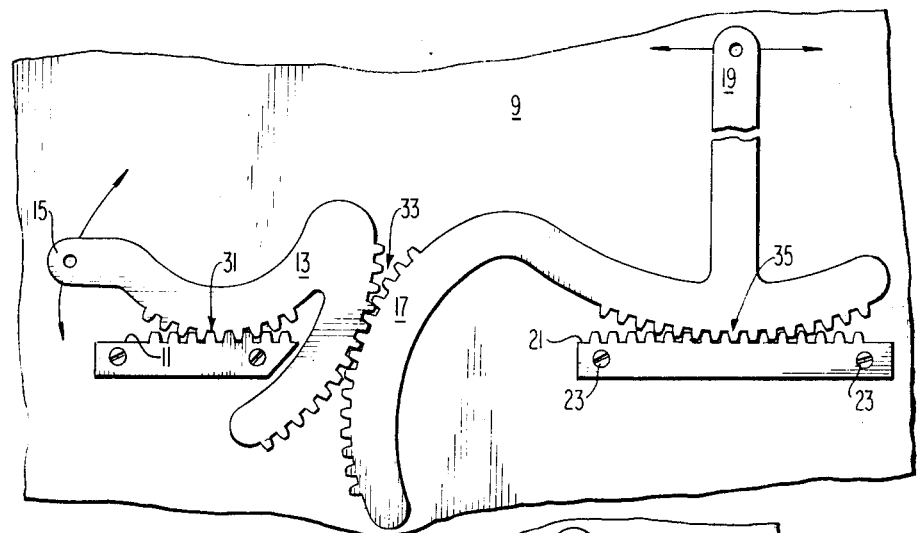
FIG. 2 is a side elevation view of the invention showing gear teeth means for constraining point contact at the engaging surfaces.

FIG. 2 shows one method for maintaining a non-slip point contact between the engaging surfaces at points 25, 27 and 29. Sets of gear teeth 31, 33 and 35 are provided on the engaging surfaces.

Figure 3:
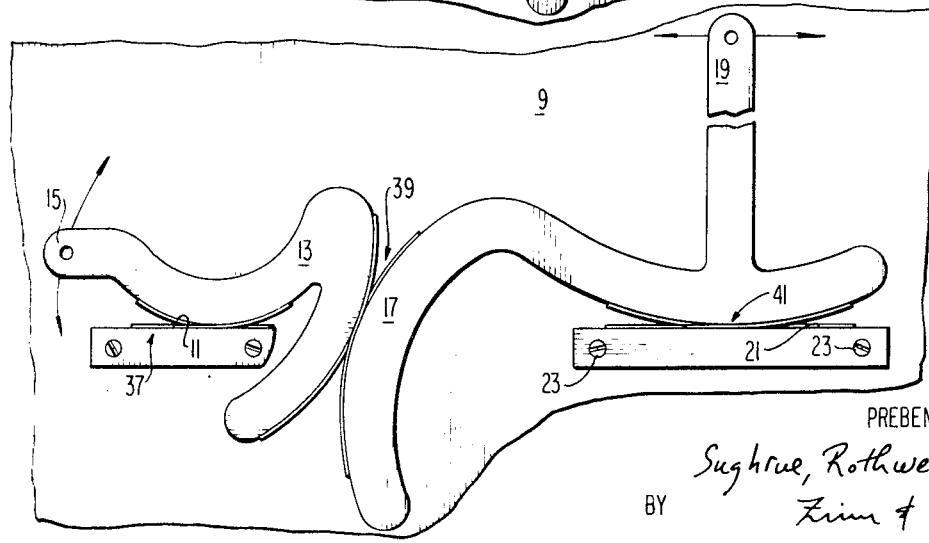
FIG. 3 is a side elevation view of the invention showing connect band means for constraining point contact at the engaging surfaces.
Figure 4:
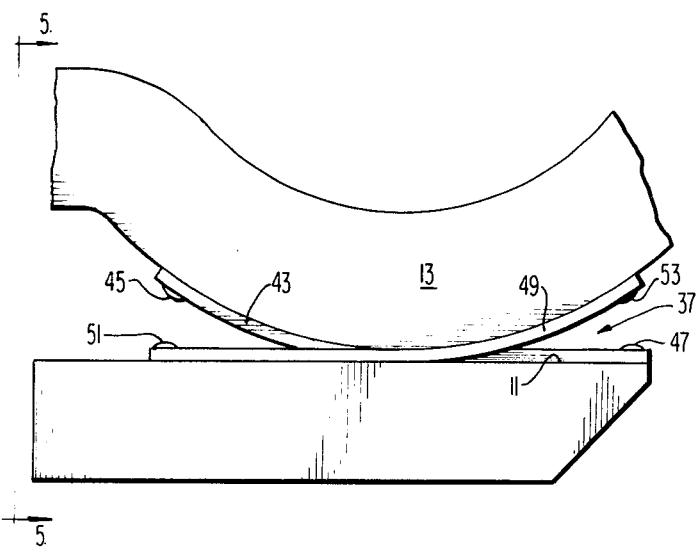
FIG. 4 is an enlarged detached view of connecting band means of FIG. 3.
Figure 5:
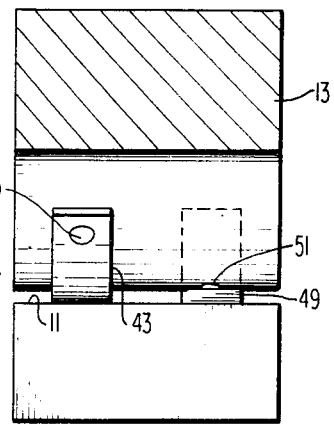
FIG. 5 is a side view of the arrangement in the direction of the arrows 5—5 in FIG. 4.

FIGS. 3, 4 and 5 show another method for requiring engaging points 25, 27 and 29 to be rolling joints. In this method a pair of resilient bands are fastened between each joint. Since the pairs of bands, indicated generally at 37, 39 and 41 are identical in concept, a discussion of pair 37 will suffice for all. As is shown in FIG. 4, each band of the pair is fastened at one end to one of the contacting members and at the other end to the other of the contacting members. Thus, resilient band 43, for example is fastened by removable fastener 45 to input member 13, tightly stretched to follow the curvature of input member 13 until the point of contact and then tightly stretched upon support surface 11 and removably fastened thereto by fastener 47. Likewise, resilient band 49 is removably fastened to input member 13 by fastener 53, tightly stretched along support surface 11 and removably fastened thereto by fastener 51. The fasteners may be of any suitable type such as screws, snaps, hook, pin and groove or the like. FIG. 5 shows that bands 43 and 49 are parallel. The tension on the pair of bands 37 prohibits input member 13 from sliding with respect to support surface 11 and thus insures rolling contact at 25.

Figure 6:
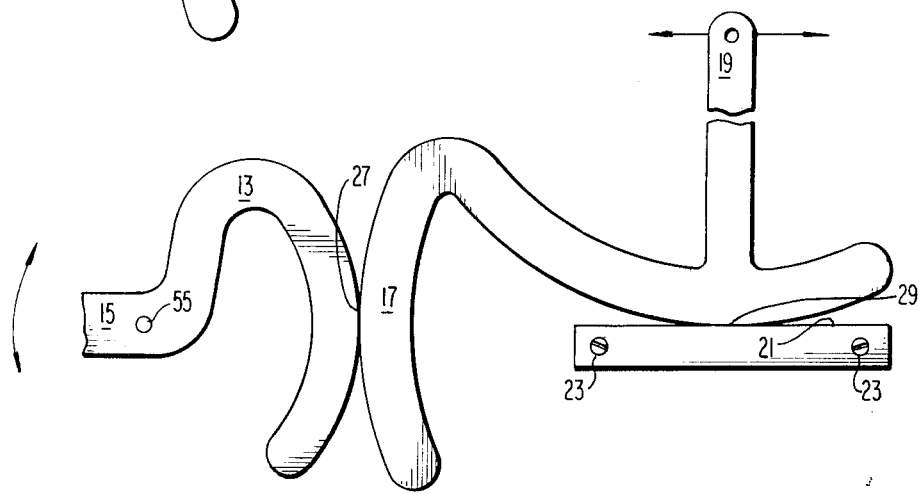
FIG. 6 is a view of a modification of the invention wherein a pivot replaces one engaging surface.

FIG. 6 shows a modification of the basic invention wherein one set of rolling engaging surfaces are replaced by pivot means 55. Although this replacement sacrifices some of the friction savings inherent in the rolling joint mechanism it adds to the mechanical stability of the mechanism and also allows a fixed rotary input to the mechanism.

Figure 7:
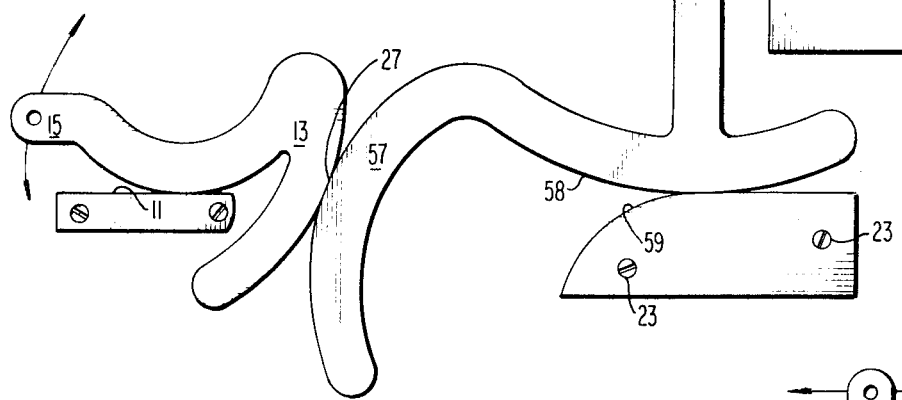
FIG. 7 is a view of a modification of the invention showing a different output from the basic invention.

FIG. 7 shows a modification of the basic invention wherein the output support surface 59 is not linear and thus the point 61 on the free end of output member 57 provides a curved path. The point 61 in FIG. 7 will trace a curve dependent upon the contour of the support surface 59 and curved surface 58. Removable fasteners 23 shown both in FIGS. 1 and 7 allow support surface 21 of FIG. 1 to be replaced by support surface 59. In FIG. 7, that portion of output member 57 which contacts input member 13 at point 27 is also altered so that the three contact points of the rolling joint mechanism always define a straight line. Thus, it is seen that by a suitable device of contacting surfaces, a variety of output motions can be produced by the rolling joint mechanism.

Member 13 has been described throughout as the input member and member 17 has been described throughout as the output member. Either point 19 or point 15 can receive an input and deliver an output and thus the designation of members 13 and 17 as input and output member respectively is purely for convenience sake and in no way limits the invention.

Although the members having surfaces 11 and 21 have been designated as being part of the frame, it is to be understood that these members could be arranged in a movable manner and certain previously movable members could be fixed to yield new mechanisms. Such a process of changing the role of different members is known in the art as kinematic inversion.

Figure 8:
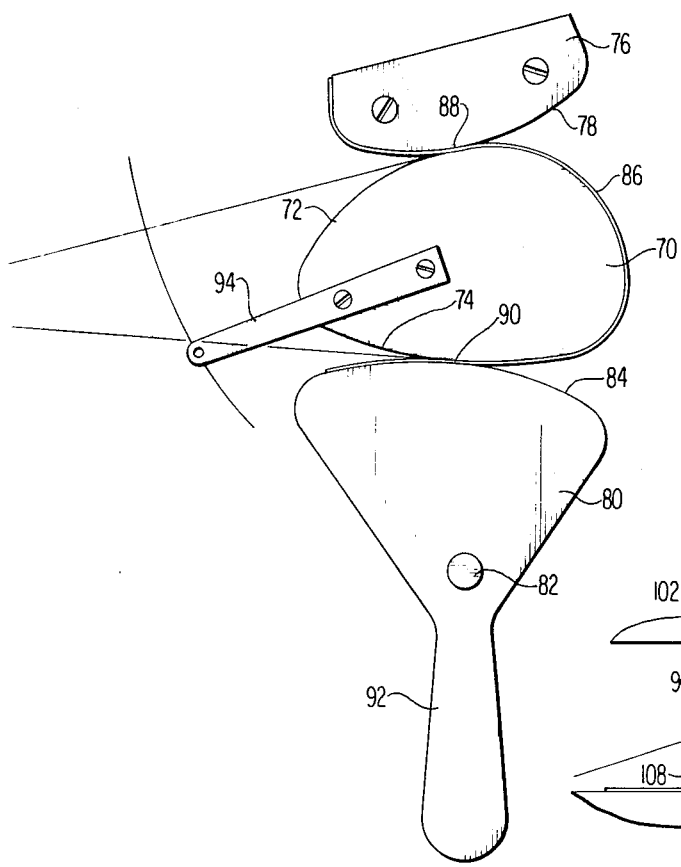
FIG. 8 is a side view of a modification with the two movable members constrained for movement on the base by a single band means.

FIG. 8 shows a modification which is somewhat similar to the arrangement shown in FIG. 6, inasmuch as a member 70 having two curved surfaces 72 and 74 is disposed in rolling engagement with a stationary base member 76 having a curved surface 78 and a movable member 80 pivoted at 82 and provided with a curved surface 84. The principle difference resides in the fact that due to the configuration of the intermediate member 70 and the curved surfaces 78 and 84, a single constraining band 86 may be used. The band 86 may be secured at its opposite ends to the members 76 and 80 respectively by any suitable means such as discussed above with respect to the other arrangements. However, to utilize a single band 86 it is essential that the tangent lines at the two points of rolling contact 88 and 90 intersect on the side of the device where the two ends of the band 86 terminate. The member 80 may be provided with a handle 92 of any desired configuration and the member 70 may also be provided with any suitable motion transmitting extension 94.

Figure 9:
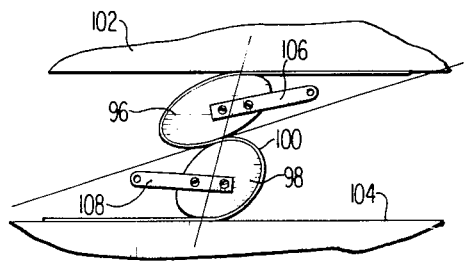
FIG. 9 is a side view of a modification wherein two non-circular rolling members are constrained for movement between parallel walls by means of a single band means.

FIG. 9 shows a modification wherein two rolling members 96 and 98, having a non-circular cross-section, are constrained for rolling movement by a single band 100 secured at its opposite ends to parallel retaining walls 102 and 104. The spacing between the walls 102 and 104 must be less than the sum of the minimum cross-sectional dimensions of each of the rolling members 96 and 98 so that these members will be retained in the same relationship to each other between the walls. Suitable motion transmitting arms 106 and 108 may be secured to the rolling members 96 and 98 respectively to provide input and output movements. Numerous other forms of motion transmitting members may be utilized depending upon the motions involved. The radius of curvature of the various points of contact can be chosen so that for a given uniform band the force required to move the members in a longitudinal direction can be made to vary according to a desired function. This is due to the fact that when the mechanism moves the change in the amount of energy stored in the band is dependent upon the radius of curvature of the members at the different points of contact. The whole mechanism has a tendency to assume a position where the amount of energy stored in the elastic band is the least possible.

Figure 10:
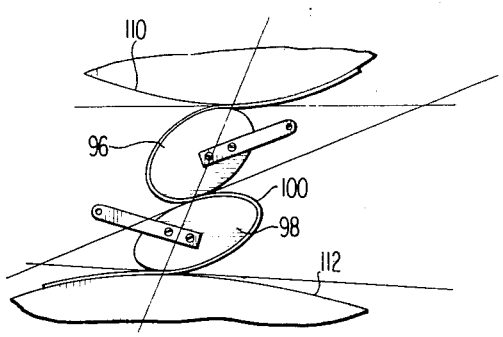
FIG. 10 is a side view of a modification similar to FIG. 9 but with curved non-parallel walls.

FIG. 10 shows an embodiment very similar to the embodiment described above with respect to FIG. 9 with the exception that the stationary surfaces 110 and 112 are curved instead of parallel. In order that a single elastic band 100 may be used to guide the movable members the requirement is that for movable member 96 the tangents at the point of contact always intersect at one side of the line through the points of rolling contact and the tangents at the point of contact for movable member 98 always intersect on the opposite side of said line.

Figure 11:
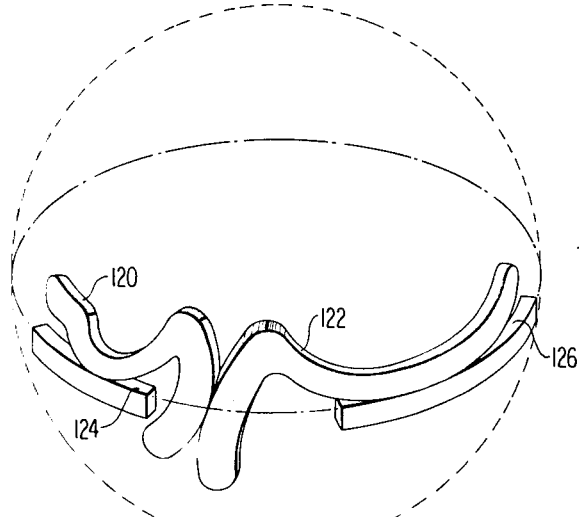
FIG. 11 is a perspective view of an arrangement similar to FIG. 1 but with the members disposed in a spherical manner.

In all of the foregoing embodiments the basic requirement was that the three points of rolling contact or the two points of rolling contact plus the pivot point be disposed along a straight line. FIG. 11 shows a variation which provides a spherical rolling joint mechanism. The movable members 120 and 122 and the stationary surfaces 124 and 126 are arranged in the same basic manner as the members and surfaces of FIG. 1. However, the parts are shaped so as to lie on the surface of a sphere. According to this type of system the basic requirement is that the points of rolling contact now lie on a great circle instead of a straight line with the lines of contact intersecting at the center of the sphere. The constraining bands have now been shown in FIGS. 1, 6, 7 and 11 but it is to be understood that the arrangement of these bands at the points of rolling contact are similar to the arrangement shown in FIGS. 4 and 5. With respect to FIG. 11 however, the bands will define the arc of a circle when laid out in planar form due to the spherical nature of the arrangement.

While the invention has been particularly shown and described with reference to a preferred embodiment

What is claimed is:

1. A rolling joint mechanism comprising support means including a first support surface, a first member movably mounted on said support means, said first member having a first curved surface, a second member movably mounted on said first support surface, said second member having first and second curved surfaces, and constraining means maintaining said first surfaces of said first and second members in rolling contact with each other while maintaining said second curved surface of said second member in rolling contact with said first support surface whereby movement of one of said members causes movement of the other of said members relative to said support means.

2. A rolling joint mechanism as set forth in claim 1 wherein said first member is pivoted on said support means and said constraining means is comprised of a single band secured to said first support surface and said first curved surface of said first member and extending about said second member along the side thereof opposite to the side adjacent the intersection of the two tangent lines through the points of rolling contact between the first and second members and the second member and first support surface.

3. A rolling joint mechanism as set forth in claim 1 wherein said support means further includes a second support surface disposed opposite to said first support surface, said first member being provided with a second curved surface disposed in rolling contact with said second support surface and said constraining means is comprised of a single flexible band grouped in a generally S-shaped fashion about said first and second movable members with the ends thereof secured to opposite supporting surfaces; said first and second movable members each having a continuous curved surface of non-circular cross-section.

4. A rolling joint mechanism as set forth in claim 3 wherein said opposite supporting surfaces are parallel to each other.

5. A rolling joint mechanism as set forth in claim 3 wherein said opposite supporting surfaces are each curved and the lines tangent to the points of rolling contact for the first member intersect on the side of said mechanism opposite the point of intersection of the lines tangent to the points of rolling contact of said second member.

6. A rolling joint mechanism as set forth in claim 1 wherein said constraining means are comprised of meshing sets of gear teeth disposed along those curved surfaces arranged in rolling contact with each other.

7. A rolling joint mechanism as set forth in claim 1 wherein said first member is pivoted on said support means and said constraining means is comprised of first and second pairs of flexible bands stretched between the first curved surfaces of the first and second members and between said second curved surface of said second member and said first support surface wherein each flexible band of a pair is attached to one surface, tightly stretched upon that surface through the point of contact between surfaces and then tightly stretched on the opposite surface and attached thereto with the flexible bands in each pair extending in opposite directions.

8. A rolling joint mechanism as set forth in claim 1 wherein said support means includes a second support surface and said first member is provided with a second curved surface disposed in contact with said second support surface and further comprising additional constraining means maintaining said second curved surface of said first member and said second support surface in rolling contact with each other.

9. A rolling joint mechanism as set forth in claim 8 wherein said additional constraining means is comprised of a meshing set of gears between said second curved surface of said first member and said second support surface.

10. A rolling joint mechanism as set forth in claim 8 wherein said additional constraining means is comprised of a pair of flexible bands, each of said flexible bands being attached at one end to said second support surface and at the other end to said second curved surface of said first member with said bands extending in opposite directions.

11. A rolling joint mechanism as set forth in claim 8 wherein all of the points of rolling contact are disposed in a straight line.

12. A rolling joint mechanism as set forth in claim 8 wherein all of the points of rolling contact are disposed along the arc of a circle.

* * * * *